United States Patent [19]

Sethofer

[11] 4,323,472
[45] Apr. 6, 1982

[54] LIQUID CRYSTAL ADMIXTURE

[75] Inventor: Nicholas L. Sethofer, San Jose, Calif.

[73] Assignee: Timex Corporation, Waterbury, Conn.

[21] Appl. No.: 215,593

[22] Filed: Dec. 11, 1980

[51] Int. Cl.³ .............................. G02F 1/13; C09K 3/34
[52] U.S. Cl. ............................ 252/299.61; 252/299.5; 252/299.63; 350/350 R
[58] Field of Search ........... 252/299.5, 299.61, 299.63; 350/350 R

[56] References Cited

U.S. PATENT DOCUMENTS 4,229,315  10/1980  Krause et al. ................... 252/299.63

FOREIGN PATENT DOCUMENTS

| 105701 | 5/1974 | German Democratic Rep. .................. 252/299.63 |
| 132591 | 10/1978 | German Democratic Rep. .................. 252/299.63 |
| 139852 | 1/1980 | German Democratic Rep. .................. 252/299.61 |
| 139867 | 1/1980 | German Democratic Rep. .................. 252/299.61 |
| 2044767 | 10/1980 | United Kingdom ........... 252/299.61 |
| 2063288 | 6/1981 | United Kingdom ........... 252/299.61 |

OTHER PUBLICATIONS

Jorkin, H., Mol. Cryst. Liq. Cryst. (Letters), vol. 56, pp. 279–281, (1980).

*Primary Examiner*—Teddy S. Gron
*Attorney, Agent, or Firm*—William C. Crutcher; Edward J. Timmer

[57] ABSTRACT

The invention provides a nematic liquid crystal composition useful in electrooptical display devices for its broad nematic temperature range, low electrical threshold and saturation voltages, steep electrooptical saturation curve and low viscosity. The admixture typically comprises:

|  | Weight % |
|---|---|
| 4-heptylphenyl-4'-butylcyclohexane carboxylate | 20–40 |
| 4-cyanophenyl-4'-propylcyclohexane carboxylate | 8–20 |
| 4-cyanophenyl-4'-butylcyclohexane carboxylate | 8–20 |
| 4-cyanophenyl-4'-pentylcyclohexane carboxylate | 8–20 |
| 5-butyl-2-cyanophenyl-1,3 dioxane | 10–40 |
| 4-cyanophenyl-4"-pentyl-4'-cyclohexyl benzoate | 2–10 |
| 4-cyanophenyl-4"-heptyl-4'-cyclohexyl benzoate | 2–10 |
| chiral additive | 0.1–0.8 |

5 Claims, No Drawings

LIQUID CRYSTAL ADMIXTURE

FIELD OF THE INVENTION

This invention relates to liquid crystal materials and, more particularly, to mixtures of liquid crystal materials to form a liquid crystal composition having particularly desirable properties for use in an electrooptical display.

DESCRIPTION OF THE PRIOR ART

As is now well known, various materials exhibit a mesophase over a temperature range adjacent their nominal melting point at which they behave neither as true liquids nor as crystalline solids. Such materials are referred to as liquid crystals, of which there are three classes. One of these classes is the nematic type in which the relatively long and thin molecules tend to line up parallel to each other in the mesophase. By their very nature liquid crystal materials exhibit both optical and electrical anisotropies. As to their dielectric properties, nematic liquids may be classified as exhibiting either negative dielectric anisotropy or positive dielectric anisotropy. The former type can be made to exhibit a dynamic scattering mode by the application of a suitable voltage across a thin layer of the material. On the other hand, in a positive dielectric anisotropy liquid crystal material, a suitable voltage causes the molecules to line up with the electric field so that optical devices utilizing such positive material are often referred to as field effect devices. Such positive dielectric anisotropic liquid crystal materials are especially desirable because of their relatively rapid response to turning on and off of the electric field and, if their positive dielectric anisotropy is quite large, their response to relatively low voltages. Thus, highly positive materials (in which the differences between the dielectric constant measured parallel to the axis of the molecule minus the dielectric constant measured perpendicular to this axis is quite large, i.e., on the order of 15 or more) are ideally suited for multiplexing operation at relatively low switching voltages, and thus are especially suited for use in the digital display of a wristwatch, calculator and the like, where operation at low voltage is a valuable capability.

In addition to a high positive dielectric anisotropy, other desirable characteristics of a liquid crystal material include: low viscosity, a wide range of temperature between the melting point and clearing point; stability as to, for example, moisture, heat, light (including ultraviolet as well as visible) and electric fields and relatively high transparency at least in the form of a thin layer, including preferably no spectrally selective absorption, i.e., the material is substantially colorless.

East German Patentschrift No. 105,701 discloses 4-n-alkylcyclohexane carboxylic acid-4'-substituted phenyl esters and liquid crystal mixtures containing at least one of these compounds for use in electrooptical displays. The compounds have the general formula:

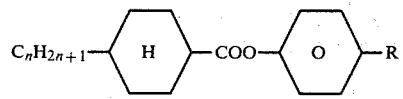

where R can be $C_mH_{2m+1}$, $OC_mH_{2m+1}$, $COC_mH_{2m+1}$, CN or $NO_2$ and n and m can be from 1 to 10. The compounds are said to be low melting, stable, colorless and to have low viscosity. When R is $OC_mH_{2m+1}$, the compounds exhibit a negative dielectric anisotropy. When R is CN or $NO_2$, a positive dielectric anisotropy is exhibited.

East German Patentschrift No. 132,591 discloses liquid crystal admixtures comprising 4-substituted-cyclohexane carboxylic acid-(4-cyanophenyl esters),

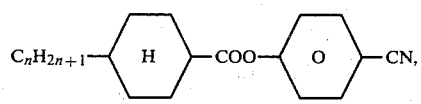

and 4-substituted-4'-cyanobiphenyls,

where R is alkyl or alkoxy, for use in electrooptical displays. These admixtures are said to exhibit low melting points, high clearing points as well as other properties necessary for electrooptical display applications.

Another compound possessing a desirable combination of properties for use in electrooptical displays are 5-substituted-2-(4-cyanophenyl)-1,3-dioxanes described in copending U.S. patent application Ser. No. 136,855 filed Apr. 13, 1980 of common assignee herewith. These compounds have the general formula

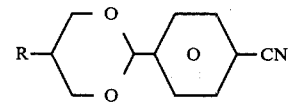

where R typically is alkyl or alkoxy. Published Japanese patent application No. 55-85583 (published June 27, 1980) and published U.K. patent application No. 2,041,354A (published September 10, 1980) also disclose dioxane compounds of the general formula

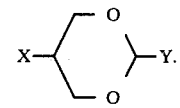

SUMMARY OF THE INVENTION

According to the present invention, there is provided an admixture of liquid crystal materials in prescribed proportions which exhibits all desirable characteristics set forth above for use in electrooptical displays, namely, a high positive dielectric anisotropy, a broad nematic temperature range, very low electrical threshold and saturation voltages, and a steep saturation curve, i.e., small difference between electrooptical threshold and saturation voltages which is especially advantageous for multiplexed displays. Threshold voltage is generally not higher than 1.5 V while saturation voltage is generally not higher than 2.0 V. Admixtures of the invention also exhibit low viscosity and relatively low temperature dependence of threshold voltage. The advantageous saturation curve of the admixtures can be varied as desired by adjusting the relative proportions of components of the admixtures.

The liquid crystal admixture of the present invention comprises:

| | Weight % |
|---|---|
| 4-heptylphenyl-4'-butylcyclohexane carboxylate | 20–40 |
| 4-cyanophenyl-4'-propylcyclohexane carboxylate | 8–20 |
| 4-cyanophenyl-4'-butylcyclohexane carboxylate | 8–20 |
| 4-cyanophenyl-4'-pentylcyclohexane carboxylate | 8–20 |
| 5-butyl-2-cyanophenyl-1,3-dioxane | 10–40 |
| 4-cyanophenyl-4''-pentyl-4'-cyclohexyl benzoate | 2–10 |
| 4-cyanophenyl-4''-heptyl-4'-cyclohexyl benzoate | 2–10 | with preferably a chiral additive, e.g., cholesteryl nonanoate, in an amount from 0.1 to 0.8 weight %.

DESCRIPTION OF PREFERRED EMBODIMENTS

The liquid crystal admixture composition of the invention is illustrated in greater detail by means of the following examples which are included for purposes of illustration rather than limitation.

EXAMPLE I

 29.0 weight %

 13.5 weight %

 10.4 weight %

 13.5 weight %

 24.0 weight %

 4.8 weight %

 4.8 weight % cholesteryl nonanoate 0.1 weight %

This admixture exhibited a melting point of −8.2° C. (crystalline to nematic liquid transition temperature) and a clearing point (nematic to isotropic liquid temperature) of 64.0° C. The electrooptic characteristics of this admixture in a display with a 10 micron plate spacing and with high/low SiO evaporation angle (alignment layer) were as follows:

$V_{10}$ (10% saturation) = 1.35 V at 25° C.
$V_{90}$ (90% saturation) = 1.95 V at 23° C.
response time (on) = 90 ms at 23° C.
response time (off) = 110 ms at 23° C.

The admixture exhibited a viscosity of about 35 cp at 25° C., and an optical birefringence ($\Delta\eta$) of 0.1.

EXAMPLE II

 24.0 weight %

 10.0 weight %

 9.0 weight %

 10.0 weight %

 35.0 weight %

 6.0 weight %

 6.0 weight % melting point = −11.3° C.
clearing point = 61.4° C.

EXAMPLE III

 27.7 weight %

 11.4 weight %

 8.4 weight %

 11.2 weight %

 24.9 weight %

 8.2 weight %

 8.2 weight % melting point = −3.8° C.
clearing point = 69.4° C.

This exemplary composition is a eutectic mixture calculated according to the Schroder-van Laar equation programmed into a HP 9825A computer.

It is apparent from the Example that the liquid crystal admixtures of the invention possess an advantageous combination of properties highly useful in electrooptical display applications. Not only do the admixtures exhibit a wide melting point—clearing point temperature range, low viscosity, steep saturation curve (small difference in threshold and saturation voltages), rapid response times, but they are also chemically stable against moisture, heat and radiation. Importantly, very low threshold and saturation voltages, namely threshold voltage about 1.5 V or below and saturation voltage about 2.0 V or below, are exhibited generally by the admixtures of the invention. The appearance of the admixtures in test displays was substantially colorless.

The first four components of admixtures of the invention,

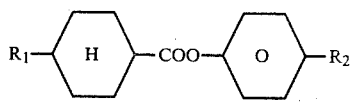

where $R_1$ is butyl, propyl, pentyl and $R_2$ is heptyl or cyano can be prepared as follows:

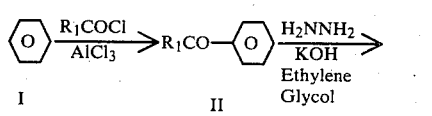
(A)

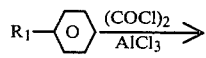

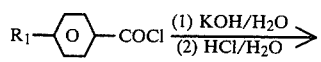

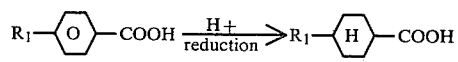

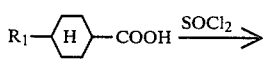
(B)

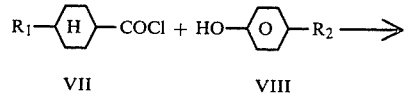

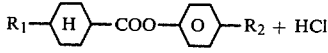

Compound II is prepared by Friedel-Crafts acylation, Compound III by Wolf-Kishner reduction and Compound IV by Friedel-Crafts acylation with the reagent being oxalyl chloride. Hydrolysis of the acid chloride proceeds in two steps. First is the potassium salt formation and second is hydrolysis with hydrochloric acid to obtain p-alkyl benzoic acid (V). Reduction of the benzene ring was performed in an autoclave with rhodium on carbon as a catalyst. A low temperature and hydrogen pressure were used to obtain predominantly cis isomer of p-alkyl-cyclohexane carboxylic acid (VI) which was transformed in high yields (90% to trans isomer in pyrrolindine with sodium methoxide.

In order to prepare compound IX, carboxylic acid was transformed into acid chloride with thionyl chloride and reacted with substituted p-phenol by Schotten-Baumann reaction. p-heptyl phenol was purchased from Aero Chemical Corp., Newark, N.J. and p-cyanophenol was purchased from Aldrich Chemical Co., Milwaukee, Wis. (catalog number C9,400-9).

All the above synthetic steps are well known to those skilled in the art. These components of the admixture are also described in East German Patentschrift Nos. 105,701 and 132,591.

The 5-pentyl-cyanophenyl-1.3-dioxane compound was prepared as taught in copending U.S. patent application Ser. No. 136,855 filed Apr. 13, 1980. The compound can also be prepared as follows:

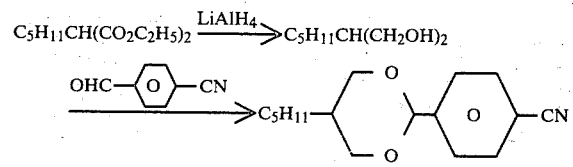

The 4-cyanophenyl-4″-akyl-4′-cyclohexyl-benzoates were prepared as follows:

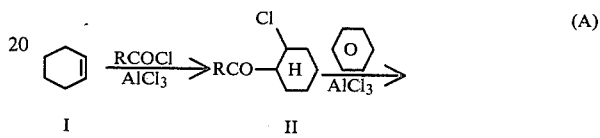
(A)

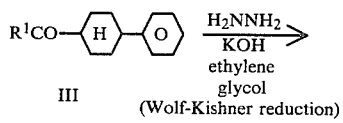
(Wolf-Kishner reduction)

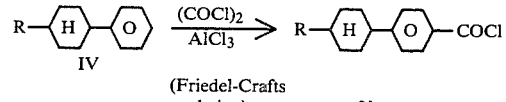
(Friedel-Crafts acylation)  V

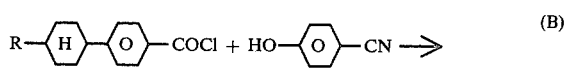
(B)

V $$R-\langle H \rangle-\langle O \rangle-COO-\langle O \rangle-CN + HCl$$

VI

Compounds II and III were prepared in one vessel as follows: Cyclohexene (I), alkyl chloride with aluminum trichloride in an inert solvent such as hexane were reacted at low temperature, e.g., starting at −60° C. gradually increasing to −40° C. and yielded 1-alkyl ketone-2-chloro-cyclohexane (Compound II) in the form of a thick oily substance (e.g., see Johnson et. al., J. Am. Chem. Soc., Vol. 67, No. 7, p. 1045 (1945) and Nenitzescu et al., Ann. 519,260 (1935)). Hexane was then decanted and an excess of benzene with an additional amount of aluminum trichloride was added. The Friedel-Crafts type reaction proceeded in normal fashion to yield Compound III where benzene assumes para position rather than ortho position. Compound III was reduced by Wolf-Kishner reduction to Compound IV. Then, Friedel-Crafts acylation yielded Compound V. Compound VI was obtained by Schotlen-Baumann esterification which is a well known synethetic step in the art. The p-cyanophenol was purchased from Aldrich Chemical Co., Catalog No. C9, 400-00.

While the invention has been explained by a detailed description of specific embodiments, it is understood that modifications can be made in them within the scope of the appended claims which are intended to include equivalents of such embodiments.

I claim:

1. A nematic liquid crystal composition comprising:

| | |
|---|---|
| 4-heptylphenyl-4'-butylcyclohexane carboxylate | 20–40 weight % |
| 4-cyanophenyl-4'-propylcyclohexane carboxylate | 8–20 weight % |
| 4-cyanophenyl-4'-butylcyclohexane carboxylate | 8–20 weight % |
| 4-cyanophenyl-4'-pentylcyclohexane carboxylate | 8–20 weight % |
| 5-butyl-2-cyanophenyl-1,3-dioxane | 10–40 weight % |
| 4-cyanophenyl-4''-pentyl-4'-cyclohexyl benzoate | 2–10 weight % |
| 4-cyanophenyl-4''-heptyl-'-cyclohexyl benzoate | 2–10 weight % |

2. The composition of claim 1 including a chiral additive in the amount of 0.1 to 0.8 weight percent.

3. The composition of claim 2 wherein the chiral additive is cholesteryl nonanoate.

4. An electrooptical display including the nematic liquid crystal composition of claim 1.

5. A nematic liquid crystal admixture having the following nominal composition:

| | |
|---|---|
| 4-heptylphenyl-4'-butylcyclohexane carboxylate | 29.0 weight % |
| 4-cyanophenyl-4'-propylcyclohexane carboxylate | 13.5 weight % |
| 4-cyanophenyl-4'-butylcyclohexane carboxylate | 10.4 weight % |
| 4-cyanophenyl-4'-pentylcyclohexane carboxylate | 13.5 weight % |
| 5-butyl-2-cyanophenyl-1,3-dioxane | 24.0 weight % |
| 4-cyanophenyl-4''-pentyl-4'-cyclohexyl benzoate | 4.8 weight % |
| 4-cyanophenyl-4''-heptyl-4'-cyclohexyl benzoate | 4.8 weight % |

* * * * *